United States Patent
Lee et al.

(10) Patent No.: US 7,679,622 B2
(45) Date of Patent: Mar. 16, 2010

(54) FOVEATION-BASED ERROR RESILIENCE ALGORITHM

(75) Inventors: Sanghoon Lee, Seoul (KR); Christine Irene Podilchuk, Bridgewater, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 778 days.

(21) Appl. No.: 09/823,793

(22) Filed: Mar. 30, 2001

(65) Prior Publication Data

US 2002/0180756 A1 Dec. 5, 2002

Related U.S. Application Data

(60) Provisional application No. 60/221,316, filed on Jul. 28, 2000.

(51) Int. Cl.
*G09G 5/00* (2006.01)
(52) U.S. Cl. .................... 345/619; 375/240.27
(58) Field of Classification Search ............ 375/240.08, 375/240.27, 240.8; 345/619
See application file for complete search history.

(56) References Cited

U.S. PATENT DOCUMENTS

| | | | | |
|---|---|---|---|---|
| 4,692,806 | A * | 9/1987 | Anderson et al. | |
| 5,208,872 | A * | 5/1993 | Fisher | |
| 5,282,255 | A * | 1/1994 | Bovik et al. | |
| 6,182,114 | B1 * | 1/2001 | Yap et al. | |
| 6,252,989 | B1 * | 6/2001 | Geisler et al. | |
| 6,754,277 | B1 * | 6/2004 | Heinzelman et al. | ... 375/240.27 |
| 6,826,233 | B1 * | 11/2004 | Oosawa | ............. 375/240.27 |

FOREIGN PATENT DOCUMENTS

WO    WO 98/33315    * 7/1998

OTHER PUBLICATIONS

Sanghoon Lee et al., Foveated Video Compression with Optimal Rate Control, Jul. 2001, IEEE Transaction on Image Processing, vol. 10, No. 7, pp. 977-992.*
Sanghoon Lee et al., Foveation-Based Error Resilience for Video Transmission over mobile Networks, 2000, IEEE, vol. 10, pp. 1451-1454.*
Sanghoon Lee et al., Unequal Error Protection for Foveation-Based Error Resilience over Mobile Networks, 2000, IEEE, vol. 2 pp. 140-143.*
Sanghoon Lee et al., Low Delay Foveated Visual Communications over Wireless Channels,1999, IEEE, vol. 3, pp. 90-94.*
T. H. Reeves Adaptive Foveation of MPEG Video , Feb. 1997, Proceedings of the fourth ACM international conference o Multimedia, pp. 231-241.*

* cited by examiner

*Primary Examiner*—Jeffery A Brier
(74) *Attorney, Agent, or Firm*—Williams, Morgan & Amerson, PC

(57) ABSTRACT

A method for improving real-time video communications using a Foveation-based unequal error protection scheme (UEP) and error resilience. In a preferred embodiment of the present invention, a real time processing module partitions a video image into at least two data bit stream signals based on a directional pointing device or a pattern filter definition of "areas of importance." These different data bit stream signals are then processed via different algorithms based on the importance of correcting errors in the data signals. The data is then transmitted. After reception at a receiving device, the data signals are regenerated and corrected to their original form.

19 Claims, 3 Drawing Sheets

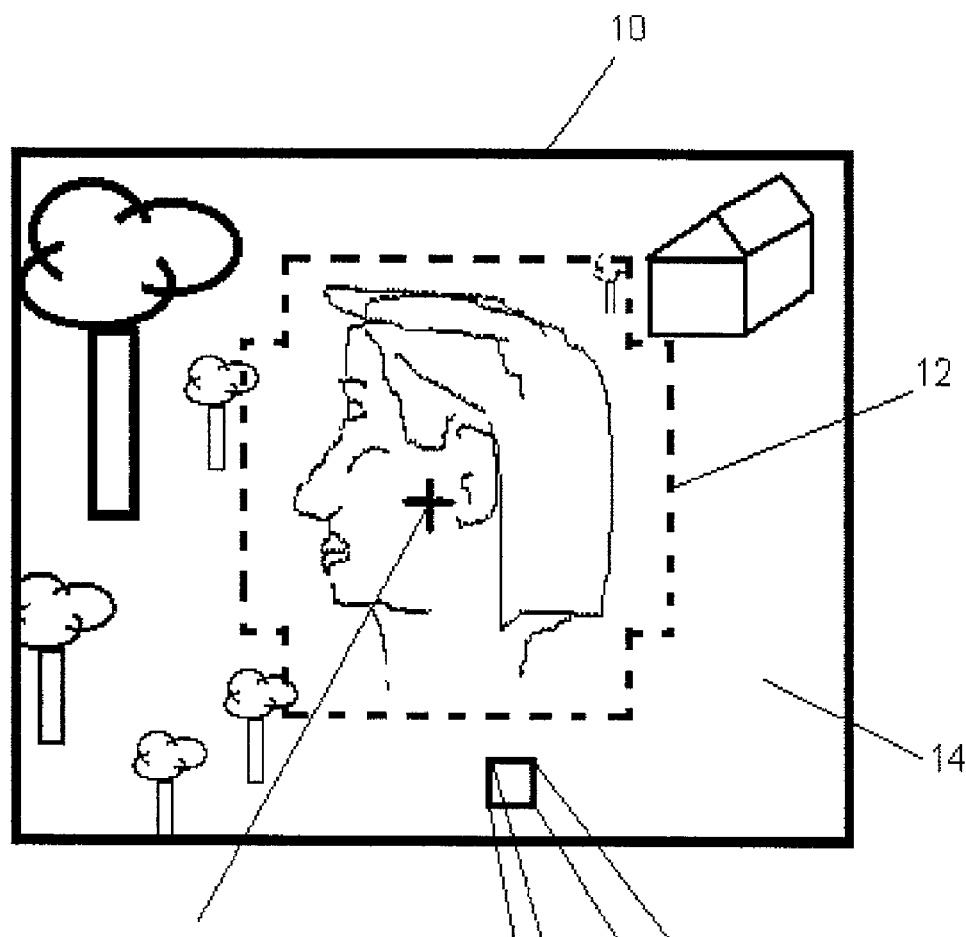
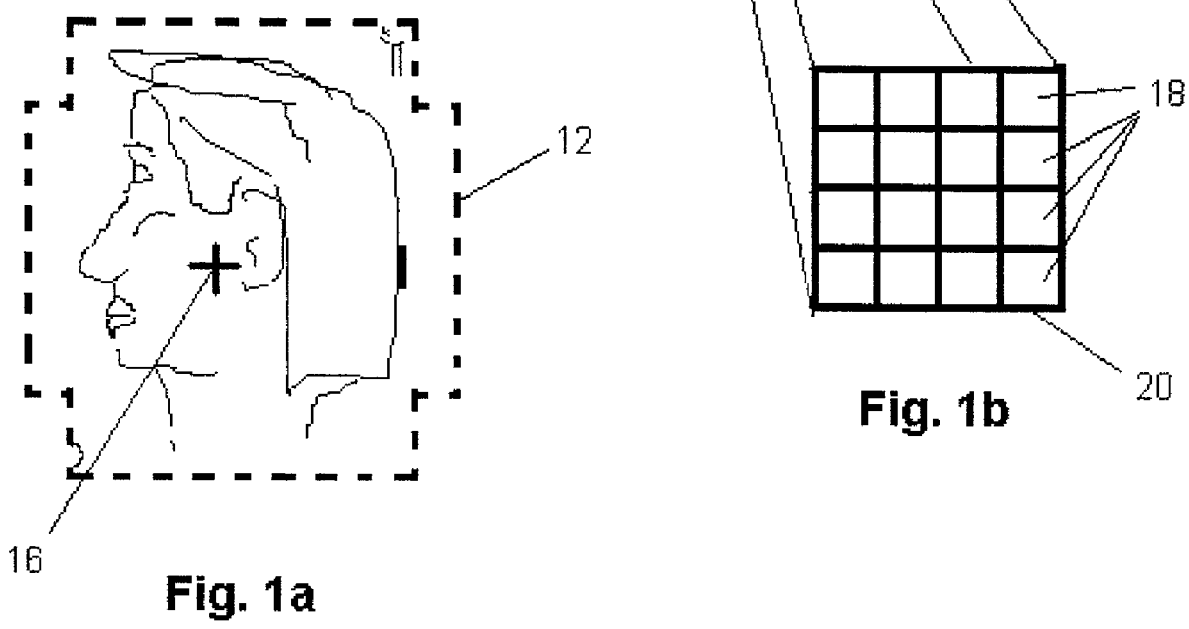
Fig. 1a
Fig. 1b

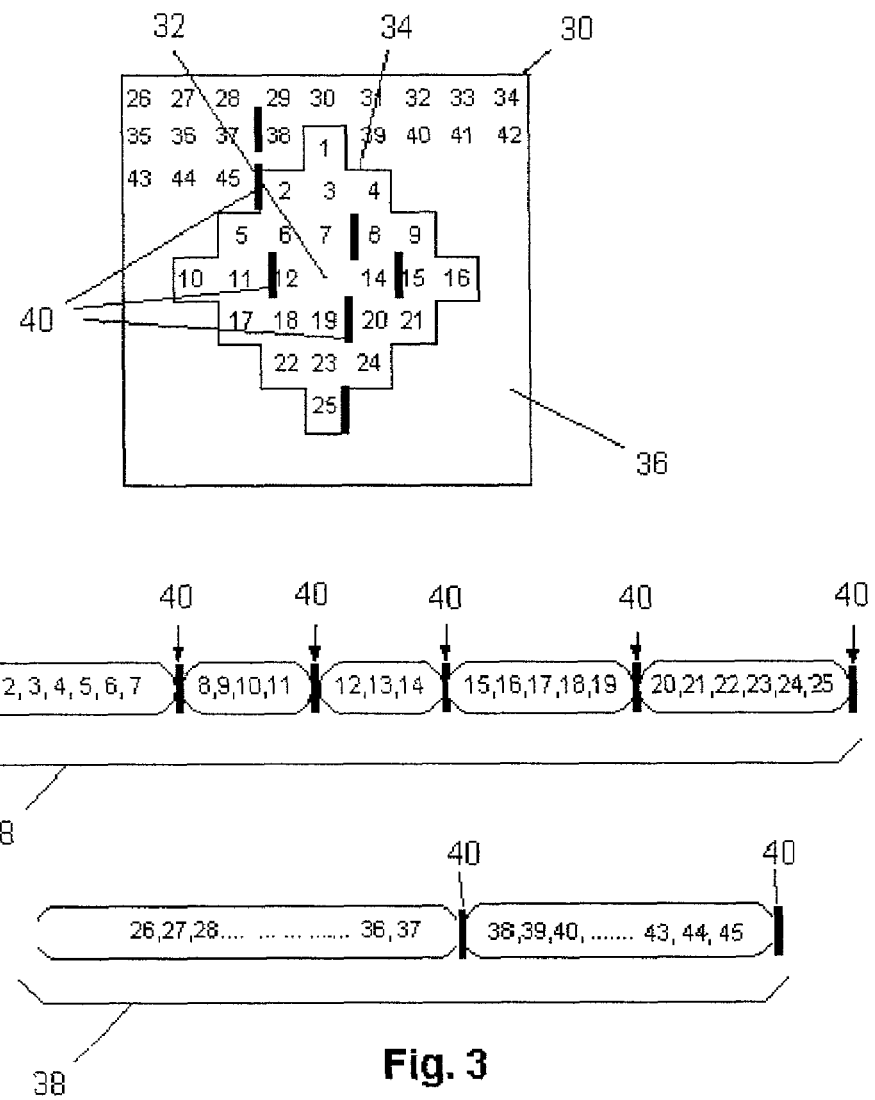
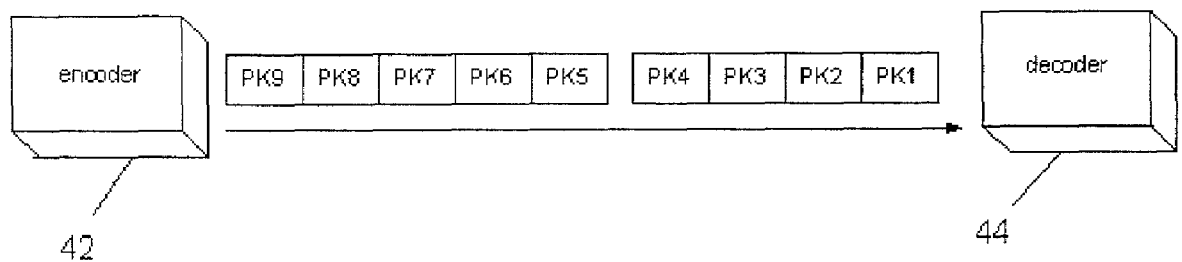
Fig. 3
Fig. 4

FOVEATION-BASED ERROR RESILIENCE ALGORITHM

CROSS REFERENCE TO RELATED APPLICATIONS

This application claims the benefit of U.S. Provisional Patent Application Ser. No. 60/221,316 filed on Jul. 28, 2000.

FIELD OF THE INVENTION

This invention relates to the field of video data communications, and more particularly to a method of providing error resilience in video data transmissions using foveation-based data bit stream partitioning.

BACKGROUND OF THE INVENTION

Video data communications can have high data error rates, particularly in mobile applications where carrier signals tend to randomly fade for several seconds due to transmitter/receiver motion acting in conjunction with signal path physical obstructions. During periods of such high data error rates, video quality can be severely degraded due to a reduction in data throughput over a finite transmission time period. Such throughput reduction results when normal data transmission time is consumed by error-correction processing activities, such as repeatedly re-transmitting a damaged data packet or processing data with time-consuming error-correction algorithms at both the transmitter and receiver ends of a communications system.

To alleviate time lost to such error-correction, various data compression techniques can be employed to reduce the size of transmitted data packets. Such techniques take advantage of the fact that smaller data packets result in smaller transmission time slots being required for re-transmission of damaged data blocks and/or enable the use of less sophisticated, and thus less time consuming, error-correction algorithms. One such data reduction technique that has particular application to video images relies on the fact that the human eye is foveated. Foveation is characterized by exponentially decreasing image resolution away from the focal point of the eye resulting in being able to see the fine details only in the area of focus.

Thus, due to this non-uniform resolution processing of the human eye, high frequency data components can be removed from areas of lesser importance without a corresponding loss of visual quality. This high frequency elimination provides an attendant reduction in the quantity of data needed for the transmission of a quality video image. Such foveated video data compression techniques have been successfully used at very low bit rates for such data communications. See S. Lee et al, "Foveated Video Quality Assessment", IEEE Trans. Multimedia and S. Lee, et al, "Foveated video compression with optimal rate control", IEEE Trans. Image Processing, both submitted, but not yet published.

In another application using foveation, U.S. Pat. No. 4,692,806 to Anderson, et al, teaches that data transmissions of a "busy" video image can be improved by performing successive processing passes over an image. A first pass captures a data block for an overall general image area, and then successive passes capture a finer area of detail or selective images of importance. Control of the "selected area" is accomplished by pointing/aiming a video camera to the points of importance based on feedback from a remote viewing screen. As is known in the art, there are many techniques for such camera manipulation to a targeted area of an image, such as using eye-tracking devices, a computer mouse, and/or a joystick. Once a targeted area is selected, detailed data processing is made only on the selected area.

However, a significant disadvantage of this technique is that it does not correct for a data transmission exhibiting a high bit error rate, such as those characteristic of the mobile applications cited above. Although such high data error rates will negatively impact both the selected area and the background area equally, the lack of extra error correction/resilience for the important "selected area" leads to significant perceptual degradation in the received video image.

SUMMARY

A method for improving real-time video communications using a foveation-based error resilience algorithm. In a preferred embodiment of the present invention, a real time processing module splits a video image into at least two data streams based on an operator pointing device or a pattern filter definition of "areas of importance." These different data streams, consisting of a foveated area and a background area, are then processed via different error correction algorithms based on the importance of correction errors in the data streams.

The important areas are protected using error-correction algorithms and error resilient codec features, and the less important areas are transmitted using less protection via error correction and error resilience. This provides greater protection to the video data in more perceptually important regions over that of less important regions, so the reconstructed video quality is significantly improved over that of conventional techniques.

BRIEF DESCRIPTION OF THE DRAWINGS

FIG. 1 shows a video image having a foveated area and a background area.

FIG. 1a shows an extract view of the foveated image area.

FIG. 1b shows an exploded view showing pixels and macroblocks, which make up the video image of FIG. 1.

FIG. 3 shows a diagram of an exemplary image bit stream created from a image and processed according the methods of the present invention.

FIG. 4 shows a packet diagram of the data stream of FIG. 3.

DETAILED DESCRIPTION OF THE INVENTION

Figure 2:
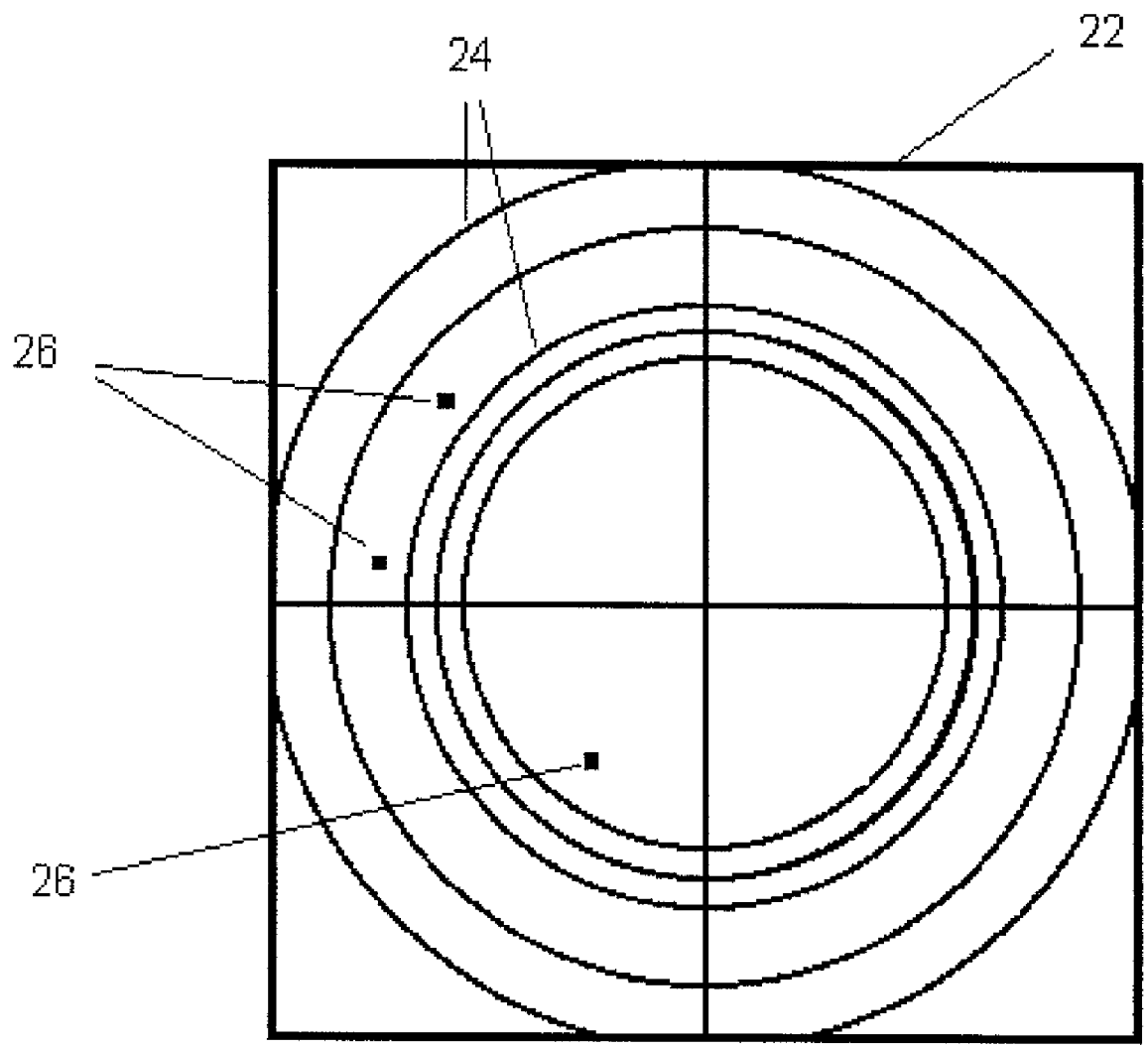
FIG. 2 shows a local bandwidth map associated with a representative foveated layer of the image shown in FIG. 1 according to the present invention.

According to a preferred embodiment of the present invention a video image is partitioned into at least two regions, with each separate region being processed differently, with available frame time being allocated between the regions to enable a real-time transmission of a video data signal. A first region, comprised of the area of high interest and importance, is processed to yield a low bit error rate, while a second region can have lower priority protection, due to its lower perceptual significance to the viewer.

The first region consists of a foveated image area that is defined by focusing on a region of importance in a video frame. This image area can be determined by visually detecting a high motion activity area in an image, by viewing a desired area of the image, such as in security camera applications, or simply be determined manually by the viewer. This defined area is then processed using a combination of error resilient features and forward error correction (FEC)

techniques, such as those specified by standards H263++, MPEG-4, or algorithms promulgated by Reed-Solomon, as is known in the art. The remainder of the image, or background layer, is processed at lower priority with less protection (and overhead), such as the use of Cyclic-redundancy-check (CRC), or parity bits.

FIG. 1 shows a video image 10 having a foveated area 12 and a background area 14. Definition of foveated area 12 can be obtained via a local or remote pointing device, which acts to control the direction of a video camera, for example. Exemplary pointing devices can include, without limiting the invention: eye-tracking device; computer mouse; joystick; retina trackers, camera under manual or computer keyboard control. Alternatively, foveated area 12 can be automatically determined through the use of foveation filters or screen pattern filters, without the need for physical pointing devices. FIG. 1a shows the resulting foveated area 12.

A foveation point 16 can be defined as a focal center of the foveated area 12. For a given foveation point 16, a maximum detectable frequency at each picture element (pixel) 18, which is a function of the eccentricity (visual angle), is obtained and converted into a local bandwidth in the discrete domain. As shown in exploded view FIG. 1b, a predetermined number of adjacent pixels 18 are grouped into a macroblock 20, with each macroblock 20 having a local bandwidth that is the average of the local bandwidths of all of the pixels 18 composing macroblock 20.

Then, by applying a threshold for local bandwidth to each macroblock 20 of video image 10, the image can be partitioned into foveated layer 12 and background layer 14, with the foveated layer consisting of all macroblocks 20 having an average local bandwidth, $f_n$, above that threshold. For example, if a threshold is assumed to have an exemplary value of 0.35 cycles per pixel, the $n^{th}$ macroblock 20 is included in foveated layer 12 if $f_n > 0.35$ cycles/pixel, otherwise it is included in background layer 14. As these macroblocks 20 are encoded, each one is partitioned to either a foveated data bit stream signal or a background data bit stream signal. This partitioning enables better video quality in the perceptually significant foveated bit stream signal.

Note that both signals are independently derived, and each signal can be further processed by an independent means, since no error occurring in the transmission of one bit stream will propagate into the other bit stream. Each data bit stream is further partitioned into packets and using various conventional communications techniques, such as interleaving, the packets are "scrambled" to reduce the effects of common data transmission error phenomena. Error resilient codec features can be applied such as data partitioning, adaptive *** updates, and reversible variable length codes (RVLC) for video compression, as is known in the art.

Alternatively, conventional data transmission synchronization markers can be periodically inserted into the data stream to provide for error isolation and resynchronization of damaged data streams signals. These markers can be used in isolation or in conjunction with other data bit stream partitioning methods. The use of data partitioning and/or synchronization markers allows uncorrectable data errors to be isolated to a single packet or group of packets in the bitstream signal, thus preventing spatial and temporal propagation of the errors throughout the remainder of the particular video bit stream signal. Synchronization markers allow for quick recovery from transmission errors.

In an embodiment using synchronization markers, such synchronization markers would preferably be inserted more frequently in the data for the foveated layer 12 due to its increased visual importance over that of the background layer 14. For example, synchronization markers could be inserted after every fifth data bit in the data stream for fovaeated layer 12, while synchronization markers for background layer 14 could inserted after each 32nd or 64th bit. Further, similar techniques can be used for video frame synchronization using reference region selection (RRS) and reference picture selection (RPS) where differential encoding is used. In such techniques, reference video frames and/or picture areas are adjusted based on feedback from the channel in order to minimize error propagation when a reference video frame is corrupted at the receiver.

Since all communication channels are lossy, that is, they introduce errors or packet losses and delays, conventional communications protocols rely on either forward error correction (FEC) or automatic repeat request (ARQ), or both, for data error correction. In FEC techniques, a damaged message is rebuilt by detective and corrective errors in the bitstream based on an additionally transmitted code word, while in ARQ, damaged message packets are retransmitted based on a Acknowledge/NotAcknowledge (ACK/NAK) feedback signal from the receiving station. Both protocols consume additional delay and overhead in order to be robust to poor channel conditions.

The partitioning of the data streams allows different error correction thresholds to be used for the foveated and background data streams. A more powerful forward error correction (FEC) algorithm can be used for foveated layer 12 which takes additional time and/or overhead, while a weaker FEC and error resilient scheme can be applied to the background layer 14 with reduced overhead and delay. A significant advantage of the use of the dual data bit streams of the present invention, is that the available time for FEC-type activity can be dynamically allocated to the foveated or background data streams in a proportion relative to the importance of error correction for that particular bit stream, producing a significant improvement in the received image display.

Alternatively, in some applications, the ARQ communications protocol can be more efficient than a FEC algorithm for error correction. Repetitive transmission of data packets that contain more errors that a predetermined error threshold is entirely at a designers discretion. For example, a low allowable error threshold can be set for foveated layer 12, and a significantly higher allowable error threshold can be set for the background layer 14.

At a receiving device, processes which reverse the steps applied at the transmitter are applied to the received data bit streams to decode the bitstream and detect and correct any errors that occurred during the transmission. In the preferred embodiment, a third high priority processing step is applied to the foveated data bit stream signal and a fourth low priority is applied to process the background data bit stream signal. The dual signals are then recombined to display a restored high quality copy of the original image on a remote display device.

In another embodiment of the present invention, an ARQ protocol can incorporate a propagation delay time that is intrinsic to the transmission system. In such an embodiment, the number of retransmissions of an incorrectly received packet can be a function of the systemic delays. This provides for earlier feedback to a transmitting station to switch to a more error resilient encoding of a data signal. Again, the dual nature of the data bit streams allows for the use of different delay constraints for the foveated and background layers 12 and 14, respectively.

For example, assuming a 100 millisecond propagation delay for foveated layer 12 and 50 millisecond delay for background layer 14, the packet loss for foveated layer 12 is smaller due to the unequal delay constraint The increase data throughput rate in the foveated layer 12 can reduce the impact of packet loss on the visual quality of the received image. Repeated packet transmissions of a facial image, for example, can produce a significantly better visual image at a receiving video device. Note that a corresponding reduction in the number of retransmission in the background layer 14 allows the system to maintain real-time data throughput.

FIG. 2 shows a local bandwidth map 22 associated with a representative foveated layer 12 of image 10 shown in FIG. 1 according to the present invention. Local bandwidths of FIG. 2 are composed of a line mapping ratio 24 that occurs when a non-uniform foveated image is mapped into a uniform image of curvilinear coordinates. Over the domain, an area is unchanged near the center of foveation point 16 and decreases as the distance from the foveation point to the periphery increases. A number of synchronization markers 26 are placed on the map that are proportional to the sum of the local bandwidths, given by the equation $$f_s = (1/N_s)\sum_{n=1}^{M} f_n \text{ for a group of macroblocks} \quad [1]$$

where fs is the sum of the local bandwidths(fn), Ns is the total number of synchronization markers 26 in a frame, and M is the number of macroblocks 20 in a frame. The uniform distribution of synchronization markers 26 over the uniform domain corresponds to the non-uniform distribution over the non-uniform foveated image.

The number of macroblocks 20 at the nth group of blocks is determined by the equation $$m_k = \arg_{min}(m) \text{ for minimizing} \left| f_s - \sum_{n=1}^{m} f_n \right| \quad [2]$$

where the index n=1 means the first macroblock at the kth group of blocks.

FIG. 3 shows a diagram of an exemplary image data bit stream 28 created from an image 30 and processed according the methods of the present invention. A foveation point 32 is selected as the center of a foveated area/layer 34. The remainder of image 30 is background area/layer 36. Derived macroblocks are numbered #1 through #45 for purposes of correlation of the blocks between image 30 and data stream 28 for foveated layer 34 and data stream 38 for background layer 36. These numbers are independent of the identifying labels used in this specification.

From an exemplary starting point at macroblock #1, the macroblock data signals are serially extracted in a left-to-right row sequence. Note that macroblock #13 includes foveation point 32. The resulting serial data bit streams 28 and 38 reflect this data ordering with synchronization markers 40 inserted at predetermined intervals in the data stream according to the significance of the data. Since macroblocks at the center of foveated area 34 are more important than those on the periphery of the same area, and even more important to image restoration than any macroblocks in background layer 36, the frequency of synchronization marker 40 insertions is highest near the center of foveated area 34, and decreases with distance from that center.

Thus, data bit stream 28 for foveated layer 34 starts at macroblock #1 and ends at macroblock #25 and includes five synchronization markers 40. Separate data bit stream 38 for background layer 36 starts at macroblock #26 and ends with macroblock #45 and includes two synchronization markers 40. It should be noted that although the sequence is abbreviated in this example, the extraction of macroblock data continues until the image is completely characterized, the lower right hand corner of image 30 using the method of in this example.

After extraction, the data bit streams can be encoded with an error correction mechanism or can be compressed for transmission to a receiving video device. In this context, the receiving video device can be either a display device or a recording or storage device or devices. Since foveated data bit stream 28 has higher significance than background data bit stream 38, it can be preferably transmitted first to insure adequate time for multiple retransmissions in the event of uncorrectable errors. In the event that such errors cause these multiple retransmissions of foveated data bit stream 28, a single transmission of lower significance background layer bit stream 38 can be adequate, even when containing errors.

FIG. 4 shows a packet diagram of the data streams of FIG. 3. After data is processed by an encoder 42, it can be "packetized" as in conventional communications protocols and transmitted to a decoder 44 located in a receiving device for reverse processing. Packets #1 though #4 represent foveated layer 34 and packets #5 through #9 represent background layer 36. The packetization can reasonably, but not necessarily, occur at the synchronization marker data boundaries.

Decoder 44 reverses the encoding of encoder 42 and performs any necessary error corrections and/or request for retransmissions. Such requests for retransmission would typically be in the form of conventional ACK/NAK signals that are routinely sent to a transmitter by a receiving station. Finally, receiving device reassembles the data to its original form and sends it to a display or recording device.

In the above examples, the exemplary image processing and exemplary protocols were presented for explanation purposes only, and were not intended to be limiting. Further, the descriptions related to a single foveated area 12 in a video image 10, although in actual applications, there can exist a multitude of foveated areas 12 in a same video image 10.

From the above it can be seen that the block layered partitioning and coding techniques of the present invention provide error-resilient data transmissions having significant speed and performance improvements over conventional error correction and error resilience for motion video. Accurate transmission of highly detailed foveated areas is possible by less protection and more degradation of perceptually unimportant background areas resulting in an overall higher quality video image.

Numerous modifications to and alternative embodiments of the present invention will be apparent to those skilled in the art in view of the foregoing description. Accordingly, this description is to be construed as illustrative only and is for the purpose of teaching those skilled in the art the best mode of carrying out the invention. Details of the embodiments may be varied without departing from the spirit of the invention, and the exclusive use of all modifications which come within the scope of the appended claims is reserved.

What is claimed is:

1. A method for partitioning a video image between a foveated area and a background area comprising the steps of:
   defining a foveation point in the video image based on a focal point of an eye;
   defining a foveared area in proximity to said foveation point;
   extracting the first plurality of data signals from said video image representing said foveated area;

extracting a second plurality of data signals from said video image representing a background area;

encoding the extracted first plurality of data signals with a first error correction protocol to create a first encoded signal; and encoding the extracted second plurality of data signals with a second error correction protocol different from the first error correction protocol to create a second encoded signal, wherein the first error correction protocol comprises a first FEC algorithm and a second error correction protocol comprises a second FEC algorithm, the first FEC algorithm being more powerful than the second FEC algorithm.

2. The method according to claim 1, wherein the step of defining said foveation point comprises the step of:

pointing a video device at a location of the image using a means for pointing.

3. The method according to claim 2, wherein the pointing means comprises at least one of: a computer keyboard; a computer mouse; a joystick, and an eye tracking device.

4. The method according to claim 1 further comprising the step of:

calculating a local bandwidth threshold based on said foveation point; and wherein the step of defining said foveation area comprises the steps of:

calculating a Local bandwidth for each pixel group in said video image; and incorporating those pixel groups having a respective local bandwidth above said local bandwidth threshold into said foveation area.

5. The method according to claim 1 further comprising the steps of:

packetizing the first encoded signal with inserted synchronization markers occurring after a first predetermined number of bits; and packetizing the second encoded signal with the inserted synchronization markers occurring after a second predetermined number of bits wherein the first number is smaller than the second number.

6. The method according to claim 1 wherein the first plurality of data signals comprises all pixel signals included in a high-resolution area of said video image.

7. The method according to claim 1 wherein the first plurality of data signals comprises all pixel signals that are included in a high motion area of said video image.

8. The method according to claim 1 wherein the first error correction protocol conforms to video communications industry standards H263++ and/or MPEG-4.

9. The method according to claim 1 wherein the second error correction protocol conforms to video communications industry standards H263++ and/or MPEG-4.

10. The method according to claim 1 further comprising the steps of:

transmitting the first encoded signal; and transmitting a second encoded signal at a predetermined time after the transmitting of said first encoded signal.

11. A method for the processing of video image data received from a first electronic device, the first electronic device having performed the steps of:

defining a foveation point in a video image based on a focal point of an eye;

defining at least one foveated area around said foveation point;

extracting a first plurality of data signals representing said foveated area;

extracting a second plurality of data signals representing a background area;

encoding the extracted first plurality of data signals with a first error correction protocol to create a first encoded signal; and encoding the extracted second plurality of data signals with a second error correction protocol different from the first error correction protocol to create a second encoded signal, the method comprising the steps of:

decoding the first transmitted encoded signal;

correcting errors within the first transmitted encoded signal with the use of a high-priority processing step to create a received foveated area;

decoding the second transmitted encoded signal; and correcting errors within the second transmitted encoded signal with use of a low priority processing step to create a received a background area.

12. The method according to claim 11 further comprising the step of:

combining the received foveated area and the received background area to create the video image data.

13. A method for partitioning a video image between a foveated area and a background area comprising the steps of:

defining a foveation point in the video image based on a focal point of an eye;

defining a foveated area in proximity to said foveation point;

extracting a first plurality of data signals from said video image representing said foveated area;

extracting a second plurality of data signals from said video image representing a background area;

encoding the extracted first plurality of data signals with a first error correction protocol to create a first encoded signal; and encoding the extracted second plurality of data signals with a second error correction protocol different from the first error correction protocol to create a second encoded signal wherein the first error correction protocol comprises a first ARQ communications protocol having a first allowable error threshold associated therewith and the second error correction protocol comprises a second ARQ communications protocol having a second allowable error threshold associated therewith, the first allowable error threshold being lower than the second allowable error threshold.

14. The method according to claim 13 wherein the step of defining said foveation point comprises the step of pointing a video device at a location of the image using a means for pointing.

15. The method according to claim 14 wherein the pointing means comprises at least one of: a computer keyboard; a computer mouse; a joystick, and an eye tracking device.

16. The method according to claim 13 further comprising the step of:

calculating a local bandwidth threshold based on said foveation point; and wherein the step of defining said foveation area comprises the steps of:

calculating a local bandwidth far each pixel group in said video image; and incorporating those pixel groups having a respective local bandwidth above said local bandwidth threshold into said foveation area.

17. The method according to claim 13 further comprising the steps of:

packetizing the first encoded signal with inserted synchronization markers occurring after a first predetermined number of bits; and packetizing the second encoded signal with the inserted synchronization markers occurring after a second predetermined number of bits wherein the first number is smaller than the second number.

18. A method, comprising:

defining a foveation point in a video image based on a focal point of an eye;

defining a foveated area in proximity to the foveation point;

extracting a first plurality of data signals indicative of the foveated area from the video image;

extracting a second plurality of data signals indicative of a background area from the video image;

encoding the extracted first plurality of data signals with a first error correction protocol to create a first encoded signal; and encoding the extracted second plurality of data signals with a second error correction protocol different from the first error correction protocol to create a second encoded signal.

19. A method comprising:

decoding a first signal indicative of at least one foveation area around a foveation point in a video image, the foveation point defined based on the focal point of an eye, wherein the first signal is encoded according to a first error correction protocol;

correcting errors within the first signal using a high-priority processing step to create a received foveared area;

decoding a second signal indicative of a background area in the video image, wherein the second signal is encoded according to a second error correction protocol different from the first error correction protocol; and correcting errors within the second signal using a low priority processing step to create a received background area.

* * * * *